C. W. PARSONS.
VEHICLE DRIVE MECHANISM.
APPLICATION FILED SEPT. 22, 1917.
1,289,531.
Patented Dec. 31, 1918.
2 SHEETS—SHEET 2.
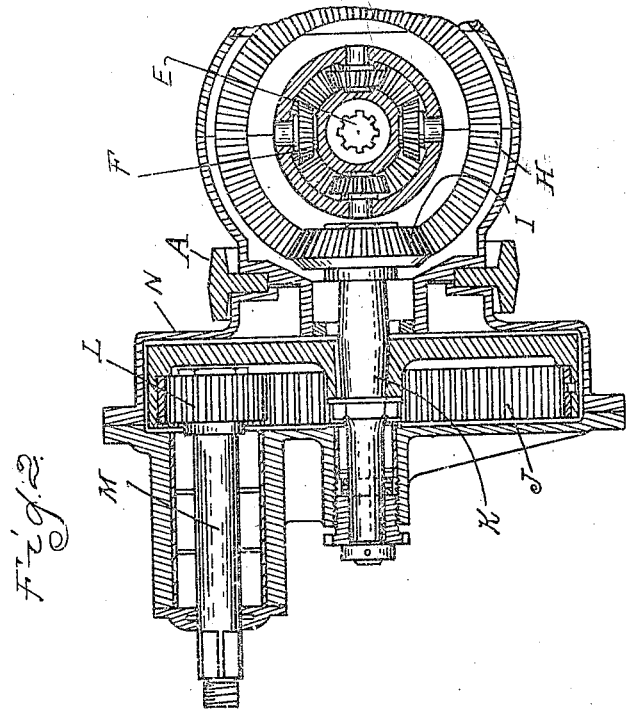
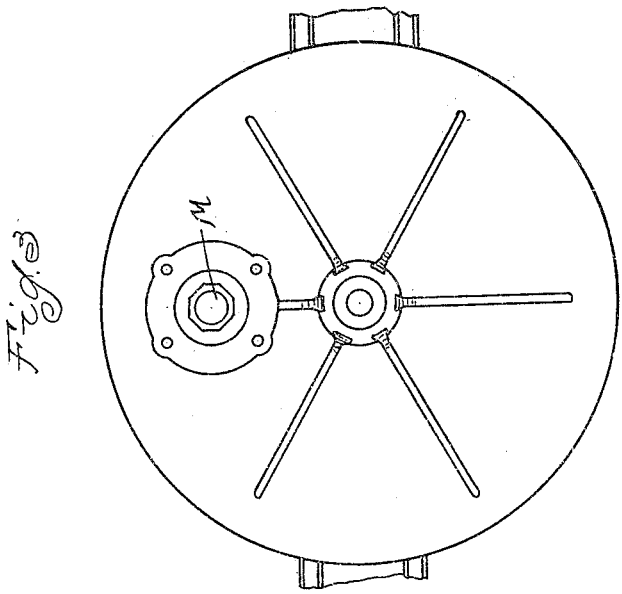
Inventor
Channing W. Parsons
By Whittemore Hulbert & Whittemore
Att'ys

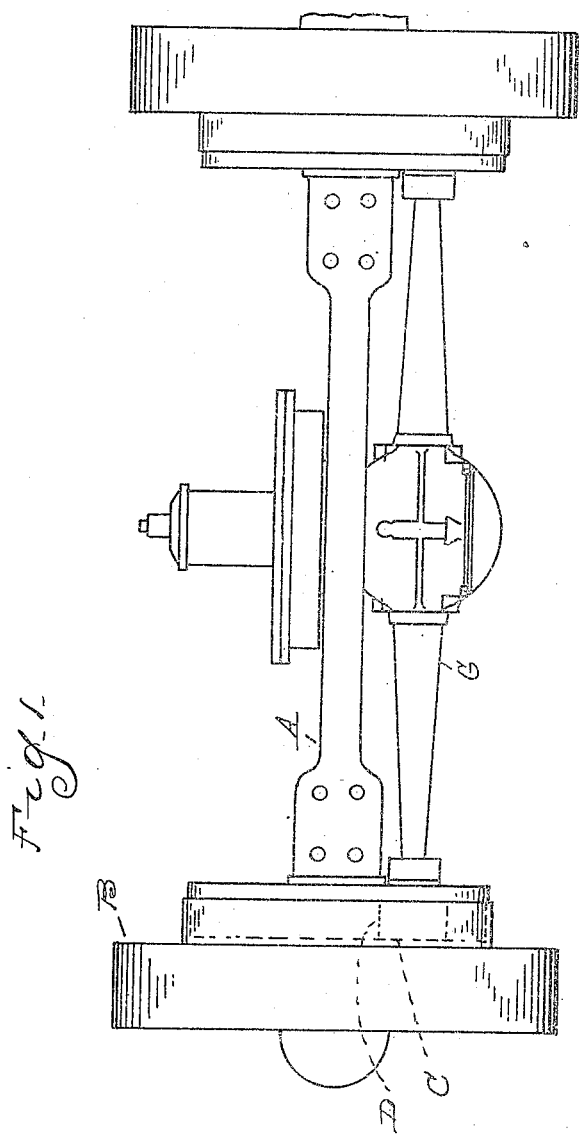

UNITED STATES PATENT OFFICE.

CHANNING W. PARSONS, OF ALMA, MICHIGAN, ASSIGNOR TO R & P TRACTOR COMPANY, OF ALMA, MICHIGAN, A CORPORATION OF ILLINOIS.

VEHICLE DRIVE MECHANISM.

1,289,531.  Specification of Letters Patent.  Patented Dec. 31, 1918.

Application filed September 22, 1917. Serial No. 192,704.

*To all whom it may concern:*

Be it known that I, CHANNING W. PARSONS, a citizen of the United States of America, residing at Alma, in the county of Gratiot and State of Michigan, have invented certain new and useful Improvements in Vehicle Drive Mechanism, of which the following is a specification, reference being had therein to the accompanying drawings.

The invention relates to vehicle drive mechanism, being particularly designed for use in connection with tractors where there is a relatively great reduction of speed between the motor and the drive wheels. In the present state of the art it is usual to drive the axle by a propeller-shaft which is arranged centrally and longitudinally of the vehicle and which is connected to the axle through the medium of a differential gearing. With certain constructions and particularly in trucks the ground wheels are driven through the medium of an internal gear mounted on the wheel and a pinion upon the jack-shaft engaging said gear. This gear-reduction is not enough, however, for properly reducing the speed in a tractor.

It is the object of the present invention to provide a transmission employing a propeller-shaft and differential gearing which will give the necessary gear-reduction. This I have accomplished by the arrangement of an internal gear and pinion intermediate the propeller-shaft and the differential gearing and by the peculiar construction of the coöperating and associated parts, as hereinafter set forth.

In the drawings:

Figure 1 is a plan view of the rear axle of a tractor embodying my invention;

Fig. 2 is a vertical longitudinal section through the differential and reduction gearing;

Fig. 3 is an end elevation thereof.

A is the dead axle preferably formed of an I-beam, B are the vehicle wheels journaled on the axle and C is an internal gear secured to the wheel B which is driven by a pinion D on the jack-shaft E. This jack-shaft is formed in separate end sections connected by a differential gearing F, the whole being arranged in a housing G which is parallel and secured to the axle A.

The differential gearing may be of any suitable construction, having the usual bevel ring-gear H and bevel pinion I in mesh therewith. Instead, however, of placing the pinion I directly upon the propeller-shaft I interpose a reduction gearing comprising the internal gear J which is mounted on the shaft K of said pinion. L is a pinion engaging the internal gear J and mounted directly upon the propeller-shaft M. These parts are held in proper relation to each other by a housing N which is secured to the axle A. This housing is provided with suitable bearings for the shafts M and K in parallel relation to each other, the shaft K passing through the central aperture in the axle A and the shaft M being arranged in a higher plane. This arrangement is advantageous, as it permits of coupling with the engine shaft without the necessity of the usual incline of the propeller-shaft, the offset of the pinion being sufficient to obtain a substantially horizontal arrangement. At the same time a high reduction in speed is obtained and without the use of large gears which would cut down on clearance. The construction is therefore particularly adapted for use upon tractors.

What I claim as my invention is:

1. The combination with an axle and a differential gearing therefor, of a propeller-shaft, a speed-reduction gearing intermediate said propeller-shaft and axle, including a pinion on the one and an internal gear-wheel on the other, and a housing for said gearing providing bearings for said pinion and gear-wheel.

2. The combination with an axle and a differential gearing thereon, including a bevel ring-gear and bevel pinion in mesh therewith, of a propeller-shaft, a gearing intermediate said propeller-shaft and differential gearing comprising a pinion upon the shaft and an internal gear-wheel connected with the bevel pinion of the differential gearing, and a housing for said intermediate gearing providing bearings therefor.

3. The combination of a beam forming a dead axle, a live axle adjacent thereto, a differential gearing for said live axle and including a bevel ring-gear and bevel pinion in mesh therewith, a propeller-shaft arranged in a plane above the differential gearing, a pinion on said propeller-shaft, an internal gear-wheel meshing with said pinion, a shaft passing through said dead axle connecting said internal gear-wheel and bevel pinion, and a housing inclosing said internal gear-wheel and pinion and providing bearings for said shafts.

4. The combination of a dead axle beam, a live axle arranged on one side of said dead axle, a differential gearing for said live axle, said gearing including a bevel pinion, a housing for said live axle and differential gearing having a portion extending through an aperture in said dead axle beam, a complementary housing on the opposite side of said dead axle beam, a shaft passing from one housing to the other, said bevel pinion mounted on said shaft, an internal gear-wheel in the other housing and mounted on said shaft, a propeller-shaft arranged in a higher plane, and a pinion on said propeller-shaft in mesh with said internal gear-wheel.

In testimony whereof I affix my signature.

CHANNING W. PARSONS.